(12) United States Patent
Li et al.

(10) Patent No.: US 10,737,222 B2
(45) Date of Patent: Aug. 11, 2020

(54) PREPARATION METHOD FOR COMPOSITE POROUS STRUCTURE AND COMPOSITE POROUS STRUCTURE MADE THEREBY

(71) Applicant: EXTREMEM, INC., Taoyuan (TW)

(72) Inventors: Yu-Ling Li, Taoyuan (TW);
Chao-Hsiang Kang, Taoyuan (TW)

(73) Assignee: EXTREMEM, INC., Taoyuan (TW)

( * ) Notice: Subject to any disclaimer, the term of this patent is extended or adjusted under 35 U.S.C. 154(b) by 21 days.

(21) Appl. No.: 16/191,303

(22) Filed: Nov. 14, 2018

(65) Prior Publication Data
US 2019/0275472 A1    Sep. 12, 2019

(30) Foreign Application Priority Data

Mar. 12, 2018 (TW) .............................. 107108292 A

(51) Int. Cl.
| | |
|---|---|
| *B01D 61/14* | (2006.01) |
| *B01D 67/00* | (2006.01) |
| *B01D 69/02* | (2006.01) |
| *B01D 69/12* | (2006.01) |
| *B01D 71/02* | (2006.01) |
| *C23C 4/02* | (2006.01) |
| *C23C 4/11* | (2016.01) |
| *B01D 69/04* | (2006.01) |
| *C23C 4/134* | (2016.01) |

(52) U.S. Cl.
CPC ....... *B01D 67/0074* (2013.01); *B01D 61/147* (2013.01); *B01D 67/0079* (2013.01); *B01D 69/02* (2013.01); *B01D 69/04* (2013.01); *B01D 69/12* (2013.01); *B01D 71/025* (2013.01); *C23C 4/02* (2013.01); *C23C 4/11* (2016.01); *C23C 4/134* (2016.01); *B01D 2323/08* (2013.01); *B01D 2325/02* (2013.01); *B01D 2325/04* (2013.01)

(58) Field of Classification Search
None
See application file for complete search history.

(56) References Cited

U.S. PATENT DOCUMENTS

| | | | | |
|---|---|---|---|---|
| 6,740,624 B1 * | 5/2004 | Hoste | ........... | C23C 14/3414 204/192.24 |
| 2009/0280262 A1 * | 11/2009 | Tung | ........... | B01D 67/002 427/448 |
| 2012/0276294 A1 * | 11/2012 | Liu | ........... | B01D 69/12 427/322 |

FOREIGN PATENT DOCUMENTS

TW          200927994 A        7/2009

* cited by examiner

*Primary Examiner* — Bradley R Spies
(74) *Attorney, Agent, or Firm* — Sinorica, LLC

(57) ABSTRACT

The present invention provides a preparation method for a composite porous structure, comprising the following steps: step (a): preparing a porous substrate having multiple pores, a first surface and a second surface; and step (b): continuously feeding a cooling fluid to contact the first surface and to flow continuously to the second surface through the pores of the porous substrate, and heating a coating material to multiple molten particles by a heat source and spraying the molten particles onto the second surface of the porous substrate, so as to form a coating layer having multiple micropores on the second surface of the porous substrate and obtain the composite porous structure formed. Besides, also provided is a composite porous structure prepared by the preparation method.

14 Claims, 5 Drawing Sheets

PREPARATION METHOD FOR COMPOSITE POROUS STRUCTURE AND COMPOSITE POROUS STRUCTURE MADE THEREBY

BACKGROUND OF THE INVENTION

1. Field of the Invention

The present invention relates to a composite porous structure and a method for preparing the same, and more particularly to a composite porous structure for film separation and a method for preparing the same.

2. Description of the Prior Arts

Thin film separation technology utilizes the difference in the materials passing through the thin film in the presence of a driving force, so as to achieve separation, concentration or purification. It has the advantages of high selectivity, easy operation, energy saving, easy amplification and so on, so it has been widely used in various industries in recent years, especially the industries of precision chemical, food, pollution prevention, biomedical engineering, biotechnology and so on, whose demands for thin film separation technology have grown rapidly.

According to the particle sizes that the porous thin films can block, the thin film separation technology can be classified into microfiltration, ultrafiltration, nanofiltration and reverse osmosis. Microfiltration (MF) utilizes a porous thin film with a pore size of 0.2 μm to 10 μm to block particles larger than the pore size under pressure, such as bacteria or suspended particles in water. Ultrafiltration (UF), which is adaptable in wastewater reclamation, pharmaceuticals, separation and concentration for protein, utilizes a porous thin film with a pore size of 10 nm to 100 nm and a pressure difference as a driving force to block macromolecular solute whose molecular weights range from 1,000 Da (Dalton) to 500,000 Da in a solution, and thereby separating solvents or small molecules from the solution. Nanofiltration (NF) is a film separation technology that lies between ultrafiltration and reverse osmosis, and is applicable to block substance, such as heavy metal ions or high valence salts, whose molecular weights ranging from 200 Da to 1,000 Da in the solution can be used to remove metal ions or desalt seawater in the industry. Reverse osmosis (RO) utilizes a porous thin film with a pore size of 1 angstrom (Å) to 50 Å, allowing only small molecules below the nanometer size to pass through, and is mainly used in the preparation of the ultrapure water.

The material of the porous thin film can be classified into organic porous thin films, inorganic porous thin films and organic-inorganic porous thin films Among them, the inorganic porous film has the advantages of high temperature resistance, acid-alkali resistance and high mechanical stability, and thus becomes a development priority of the thin film separation technology. Typical methods for preparing inorganic porous thin films are: (1) sol-gel, (2) solid-state sintering, (3) chemical vapor deposition (CVD), etc. All of them require complicated preparation steps, which results in a lengthy preparation time and an increased cost. Due to the process requirements, only specific raw materials are acceptable, e.g., only vaporizable raw materials are acceptable for the reaction of CVD. Furthermore, the aforementioned methods frequently use harmful solvents or organometallic compounds during the preparation of precursor materials, which also results in environmental pollution and does not meet current environmental protection demands.

In order to solve the aforementioned problems, thermal spraying has been proposed to prepare an inorganic porous thin film. The thermal spraying utilizes a heat source to rapidly heat the coating raw material into molten particles, and then drives the molten particles to hit the surface of the substrate through the high-speed jet to form a coating. Under such high temperature treatment, a liquid on the surface of the substrate would be vaporized into steam and then pass through the coating, so as to form the pore structure of the porous film.

For example, TW Patent No. 200927994 discloses a method for forming a composite membrane having a porous coating layer. By the disclosed method, a raw material was transformed into molten or semi-molten droplets with a heat source and then sprayed onto the surface of the porous substrate filled with liquid in its pores. Liquid on the porous substrate would be vaporized into steam and pass through the molten or semi-molten droplets to form the composite membrane having a porous coating layer.

Although thermal spraying technique can simplify or shorten the film production process, the porous film obtained by the conventional thermal spraying has non-uniformity and wide distribution in pore size, resulting in a poor blocking efficiency.

SUMMARY OF THE INVENTION

In view of the technical defects of the conventional porous thin film or its preparation method, an objective of the present invention is to provide a simple and economic method for preparing a composite porous structure, and thus has more potential for commercial practice.

Another objective of the present invention is to provide a method for preparing a composite porous structure, which can produce a composite porous structure with a blocking efficiency more than 99%.

To achieve the aforementioned objective, the present invention provides a preparation method for a composite porous structure, comprising the following steps: step (a): preparing a porous substrate having multiple pores, a first surface and a second surface opposite to the first surface; and step (b): continuously feeding a cooling fluid to contact the first surface and to flow to the second surface through the pores of the porous substrate, and at the same time, heating a coating material to multiple molten particles by a heat source and spraying the molten particles onto the second surface of the porous substrate, so as to form a coating layer having multiple micropores on the second surface of the porous substrate, and a composite porous structure is formed. Wherein, the coating material is an organic polymer coating material or an inorganic coating material.

According to the present invention, since a cooling fluid is continuously fed in the system, the cooling fluid contacts the first surface of the porous substrate, and thus a part of the cooling fluid would be at least filled in the pores of the porous substrate, and even a portion of the cooling fluid flows to the second surface through the pores of the porous substrate. When the multiple molten particles hit on the second surface of the porous substrate, the thermal energy accompanied with the molten particles can continuously vaporize the cooling fluid in the pores into the steam, and such steam will pass through the coating layer formed by the molten particles and create many micropores. Since the molten particles hit the second surface while the cooling fluid continuously contacts the first surface, the cooling fluid can remove the excessive heat energy, maintain the overall temperature of the porous substrate and continuously fill the pores in the porous substrate. Therefore, the failure that the liquid in the pores cannot be vaporized and fails to form micropores when the thermal spraying method is adopted alone and the porous substrate is gradually heated can be overcome. Therefore, the preparation method of the present invention has a simple manufacturing process, greatly shortens the preparation time, and obtains a composite porous structure with high uniformity in pore size, and thus can make the composite porous structure have a blocking efficiency more than 99%.

According to the present invention, the molten particles include substantially fully-molten particles or semi-molten particles, and therefore the melted particles may be liquid or solid. The temperature difference between the molten particles and the porous substrate can affect the final morphology of the molten particles stacked on the second surface of the porous substrate, as well as the pore size of the coating layer. Preferably, the temperature of the molten particles is higher than the temperature of the cooling fluid; in this way, the cooling fluid can have a better cooling effect on the porous substrate.

In some embodiments, the heat source temperature of step (b) is between 100° C. and 10000° C.; the cooling fluid temperature is between 5° C. and 60° C.

In some embodiments, the cooling fluid of step (b) can be water, alcohols, ketones or a combination thereof. For example, the water can be, but is not limited to, deionized water or the like. The alcohols can include, but are not limited to, alcohols having a carbon number of 1 to 5, such as ethanol, 1-propanol, 2-propanol, and combinations thereof. The ketones can include, but are not limited to, ketones having 3 to 4 carbon atoms, such as acetone, and combinations thereof.

According to the invention, the material of the porous substrate can be an organic polymer material, a ceramic material or a metal material. For example, the organic polymer material can include, but is not limited to, a polyolefin such as polyethylene (PE), polypropylene (PP), etc., polytetrafluoroethylene (PTFE), polyacrylonitrile (polyacrylonitrile), or polyurethane (PU). The ceramic material can include, but is not limited to, aluminum oxide ($Al_2O_3$), silicon dioxide (SiO2), magnesium oxide (MgO), titanium dioxide ($TiO_2$), zinc oxide (ZnO), zirconium oxide ($ZrO_2$), or a combination thereof. The metal material can include, but is not limited to, cobalt (Co), iron (Fe), nickel (Ni), copper (Cu), aluminum (Al), a combination thereof or the like.

In some embodiments, the thickness of the porous substrate is less than 20 mm. Preferably, the thickness of the porous substrate is between 1 mm and 20 mm.

In some embodiments, the average pore diameter of the multiple pores in the porous substrate is less than or equal to 50 μm. Preferably, the average pore diameter of the multiple pores in the porous substrate is between 0.1 μm and 50 μm.

Preferably, step (a) can include step (a1): preparing a porous substrate having the pores; and step (a2): filling a liquid into the pores. This technical means can make the pores filled with sufficient liquid, and thereby providing a method for preparing a composite porous structure with a higher pore diameter consistency.

According to the invention, the step (a2) of filling the liquid into the pores can be, but is not limited to, pressurized filling, sprayed filling, vacuum suctioned filling or immersed filling.

According to the invention, the liquid is water, alcohols, ketones, or combinations thereof. For example, the water can be, but is not limited to, deionized water or the like. The alcohols can include, but are limited to, alcohols having a carbon number of 1 to 5 such as ethanol, n-propanol, isopropanol, and combinations thereof. Ketones can include, but are not limited to, ketones having 3 to 4 carbon atoms such as acetone, and combinations thereof.

According to the invention, the cooling fluid contains the liquid as one of its components or the cooling fluid is just the same as the liquid.

The volume flow of the cooling fluid starting to contact the porous substrate is the inflow of the cooling fluid, and the volume flow of the cooling fluid that stops contacting the porous substrate is the outflow of the cooling fluid. The ratio of the inflow to the outflow of the cooling fluid can affect the heat dissipation performance of the porous substrate, thereby affecting the pore size and consistency of the pores in the coating layer made by steam. According to the invention, the ratio of the inflow volume to outflow volume of the cooling fluid is between 1:0.9 and 1:1.

The flow rate of the cooling fluid can also affect the heat dissipation performance of the porous substrate, thereby affecting the pore size uniformity of the pores in the coating layer made by steam. Preferably, the flow rate of the cooling fluid is between 0.1 L/min and 10 L/min.

According to the invention, the heat source in this step (b) can be, but is not limited to, flame, arc or plasma.

The number of spraying steps affects the final coating thickness and the pore size of the micropores in the coating layer. Therefore, the molten particles can be sprayed on the second surface of the porous substrate repeatedly in step (b) and the number of the spraying steps can be determined in accordance with the required thickness of the coating layer. Preferably, the number of the spraying steps is 2 to 25.

The spray distance of the molten particles from the heat source to the surface of the porous substrate affects the characteristics of the final coating layer. If the spray distance is too short, the surface of the porous substrate may be thermally deformed; if the spray distance is too long, the thermal deformation of the porous substrate surface can be avoided, but the temperature and rate for heating the molten particles are decreased, decreasing the density of the coating layer. In some embodiments, the spray distance is between 5 cm and 30 cm.

In some embodiments, the coating layer material is an inorganic coating raw material, and the coating layer comprises at least one inorganic coating material selected from alkali metals, alkaline earth metals, silicates, aluminates, borates, titanates, phosphates, oxides, nitrides, oxynitrides, carbides, oxycarbides and halogen compounds. For example, the alkali metal can be, but is not limited to, a metal powder such as lithium or sodium; the alkaline earth metal can be, but is not limited to, a metal powder such as magnesium or calcium; the silicate can be, but is not limited to, lithium silicate, magnesium silicate, magnesium lithium silicate, aluminum silicate, zirconium silicate, hydrated sodium silicate or hydrated magnesium silicate, etc.; the aluminate can be, but is not limited to, calcium aluminate and the like; the borate can be, but is not limited to, sodium metaborate, sodium tetraborate and the like; the titanate can be, but is not limited to, magnesium titanate or calcium titanate and the like; the phosphate can be, but is not limited to, calcium phosphate, sodium phosphate or the like; the oxide can be, but is not limited to, a metal oxide such as alumina or zirconia; the nitride can be, but is not limited to, a metal nitride such as aluminum nitride or boron nitride; the oxynitride can be, but is not limited to, metal oxynitrides such as aluminum oxynitrides or silicon oxynitrides; the carbides can be, but are not limited to, metal carbides such as tungsten carbide or aluminum carbide; the oxygen carbides can be, but are not limited to, metal oxide carbides such as aluminum oxide carbides; the halogen compound can be, but is not limited to, magnesium fluoride or the like. In other embodiments, when the coating material is an organic coating material, the organic coating material is selected from, but not limited to, polyethylene, polypropylene, or polytetrafluoroethylene.

According to the invention, the preparation method can be performed in an atmospheric environment or in a vacuum environment.

In addition, the present invention also provides a composite porous structure prepared by the aforementioned preparation method. The composite porous structure comprises a porous substrate containing multiple pores and a coating layer having multiple micropores, the porous substrate having a first surface and a second surface opposite to the first surface, and the coating layer is disposed on the second surface of the porous substrate, and the material of the coating layer is an organic polymer material or an inorganic material.

In some embodiments, the material of the porous substrate can be an organic polymer material, a ceramic material, or a metal material. Based on the aforementioned preparation method, inorganic coating organic substrate composite porous structure, organic coating organic substrate composite porous structure, inorganic coating ceramic substrate composite porous structure, organic coating ceramic substrate composite porous structure, inorganic coating metal substrate composite porous structure, organic coating metal substrate composite porous structure, etc. can be obtained. For example, the material of the porous substrate is an organic polymer material, which can include, but is not limited to polyolefins such as polyethylene, polypropylene, etc., polytetrafluoroethylene, polyacrylonitrile, polyurethane, etc.; the material of the porous substrate is a ceramic material, which can include, but is not limited to, alumina, silica, magnesia, titania, zinc oxide, zirconium oxide, or a combination thereof; the material of the porous substrate is a metal material, which can include, but is not limited to, cobalt, iron, nickel, copper, aluminum or a combination thereof. Compared with the existing porous films, the composite porous structure of the present invention can select more combinations of materials, thereby increasing the application potential.

In some embodiments, the coating layer comprises at least one inorganic coating material selected from alkali metals, alkaline earth metals, silicates, aluminates, borates, titanates, phosphates, oxides, nitrides, oxynitrides, carbides, oxycarbides and halogen compounds. For example, the alkali metal can be, but is not limited to, a metal powder such as lithium or sodium; the alkaline earth metal can be, but is not limited to, a metal powder such as magnesium or calcium; the silicate can be, but is not limited to, lithium silicate, magnesium silicate, magnesium lithium silicate, aluminum silicate, zirconium silicate, hydrated sodium silicate or hydrated magnesium silicate, etc.; the aluminate can be, but is not limited to, calcium aluminate and the like; the borate can be, but is not limited to, sodium metaborate, sodium tetraborate and the like; the titanate can be, but is not limited to, magnesium titanate or calcium titanate and the like; the phosphate can be, but is not limited to, calcium phosphate, sodium phosphate or the like; the oxide can be, but is not limited to, a metal oxide such as alumina or zirconia; the nitride can be, but is not limited to, a metal nitride such as aluminum nitride or boron nitride; the oxynitride can be, but is not limited to, metal oxynitrides such as aluminum oxynitrides or silicon oxynitrides; the carbides can be, but are not limited to, metal carbides such as tungsten carbide or aluminum carbide; the oxygen carbides can be, but are not limited to, metal oxide carbides such as aluminum oxide carbides; the halogen compound can be, but is not limited to, magnesium fluoride or the like. In other embodiments, when the coating material is an organic coating material, the organic coating material is selected from, but not limited to, polyethylene, polypropylene, or polytetrafluoroethylene.

Preferably, the average pore size of the micropores of the porous coating layer in the composite porous structure is between 0.01 μm and 5 μm. Preferably, the porous coating layer in the composite porous structure has an average thickness of 5 μm to 500 μm.

In some embodiments, the porous substrate can have, but is not limited to, a shape of a hollow column, a hollow cone, a hollow tube, or the like.

DETAILED DESCRIPTION OF THE PREFERRED EMBODIMENTS

Hereinafter, the preferred embodiments of the present invention will be described by the following examples, and one skilled in the arts can easily realize the advantages and effects in accordance with the present invention. Various modifications and variations could be made in order to practice or apply the present invention without departing from the spirit and scope of the invention.

The method of preparing a composite porous structure of the present invention can be described in the following Example 1 and Example 2:

Example 1

Figure 1:
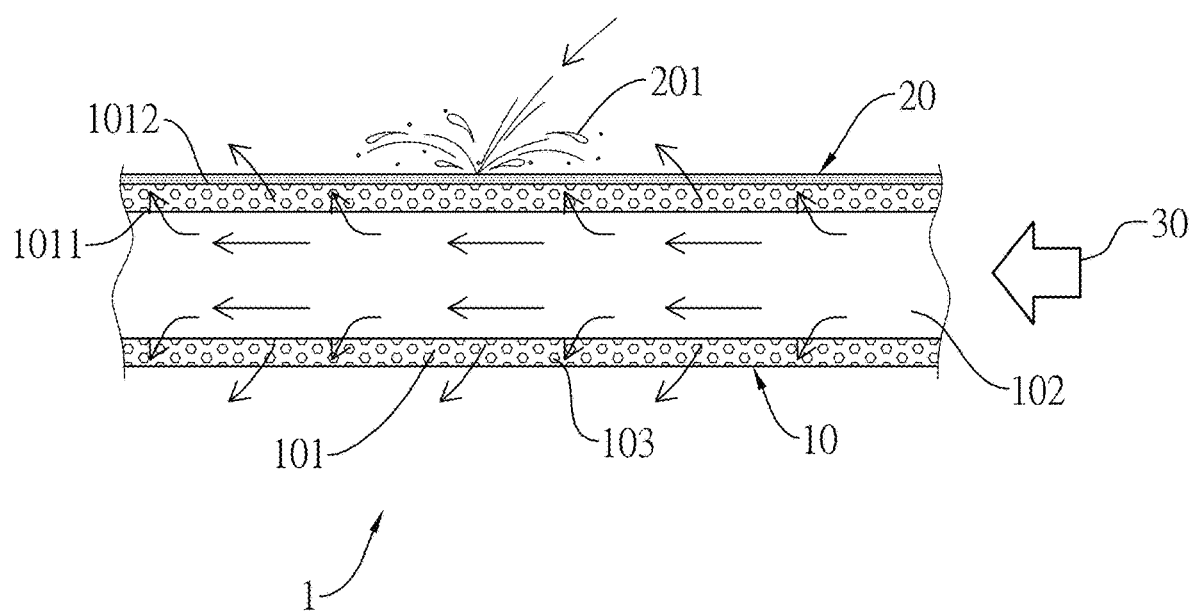
FIG. 1 is a schematic view of step (b) in the preparation method for a composite porous structure of Example 1.

First, referring now to FIG. 1, a hollow tubular porous substrate 10 in the step (a1) is prepared. The porous substrate 10 has a tube wall 101, an axial channel 102 and multiple pores 103. The axial channel 102 is formed in the tube wall 101, and the pores 103 are concavely formed on the tube wall 101. The tube wall 101 has a first surface 1011 (i.e., an inner wall surface) and a second surface 1012 (i.e., an outer wall surface) opposite to the first surface 1011. The tube wall 101 has a thickness of 2.5 mm, a length of 300 mm, an inner diameter of 29.5 mm and an outer diameter of 30 mm. The porous substrate 10 is made of stainless steel and has an average diameter of 3 μm. Subsequently, in the step (a2), the porous substrate 10 is immersed in a tank filled with deionized water to allow the multiple pores 103 in the porous substrate 10 to be full with deionized water.

Next, referring to FIG. 1, the cooling fluid 30 at 25° C. is fed into the axial channel 102 at a flow rate of 3 L/min in the step (b), so that the cooling fluid 30 continuously contacts the first surface 1011 and maintains the overall temperature of the porous substrate 10. A portion of the cooling fluid 30 flows through the pores 103 to the second surface 1012. At the same time, by way of a heat source of 8000° C. generated by a plasma, the alumina coating materials are heated to multiple molten particles 201 at a temperature of about 500° C. in the atmosphere, and the molten particles 201 are sprayed onto the second surface 1012 of the porous substrate 10 with a spraying distance of 10 cm between the heat source and the second surface 1012, so as to obtain a coating layer 20 having multiple micropores. The ratio of the inflow to outflow volume of the cooling fluid 30 is 1:0.99, indicating that the deionized water of the cooling fluid 30 is continuously filled in the multiple pores 103 of the porous substrate 10. In this step, the sprayed molten particles 201 are stacked on the second surface 1012. The deionized water in the multiple pores 103 can be vaporized into steam through the heat (i.e., a temperature greater than 100° C.) of the molten particles 201, so that steam can penetrate through the thin layer to form micropores. Besides, in the step, the molten particles 201 can be continuously cooled and solidified by the cooling fluid 30 continuously flowing in the axial channel 102, and thereby a coating layer is formed on the second surface 1012 to obtain a composite porous structure 1. Herein, the average thickness of the coating layer 20 is 28 μm after repeating the above steps three times in synchronization with step (b).

Figure 2:
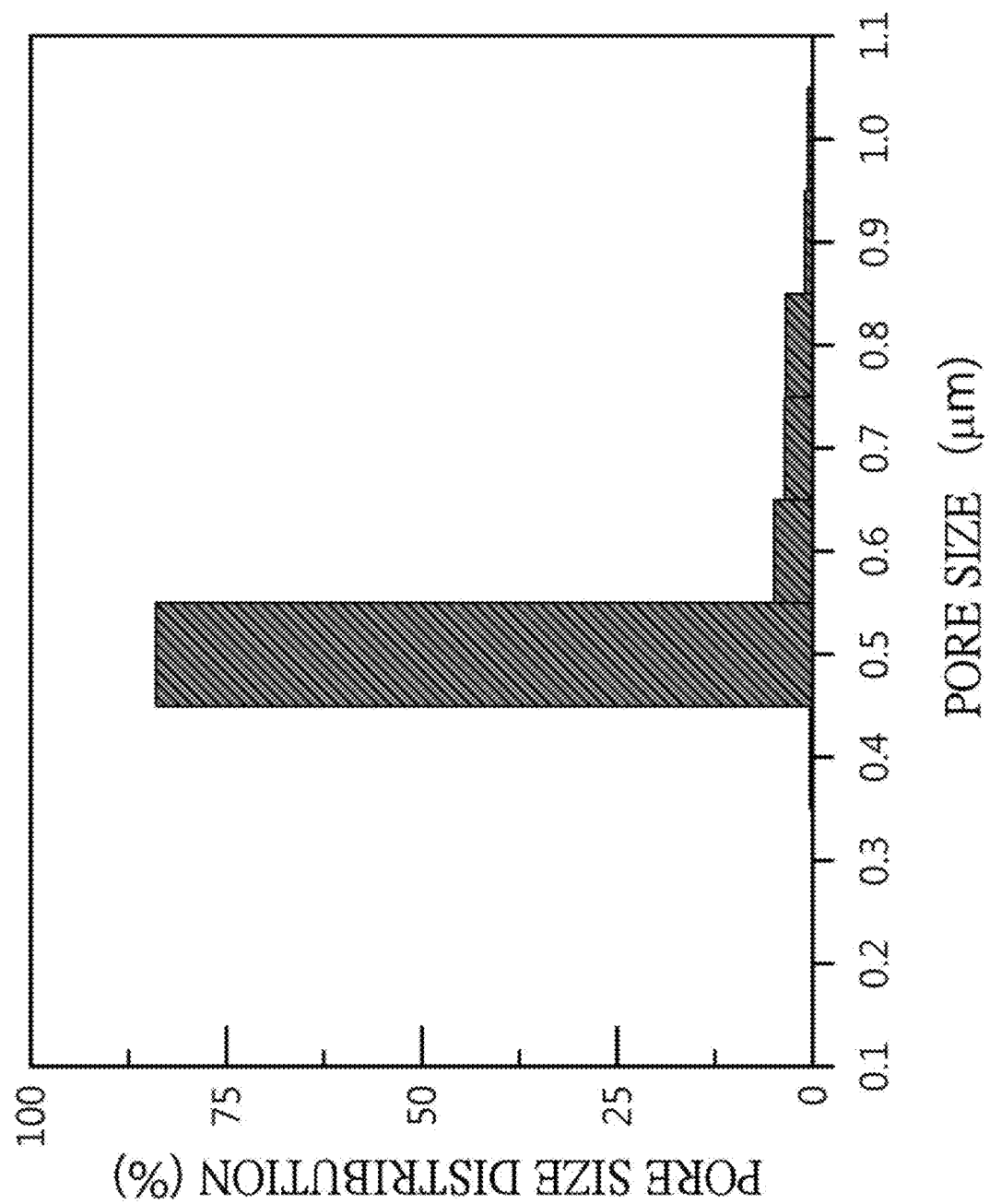
FIG. 2 is a pore size distribution diagram of the micropores in the coating layer of the composite porous structure of Example 1.

The pore size distribution of the micropores of the porous coating layer 20 of the composite porous structure 1 is shown in FIG. 2. It can be seen that the pore size distribution of the micropores is very narrow and the pore size has a high uniformity. The porous coating layer 20 of the composite porous structure 1 is measured by a pore size analyzer, PMI CFP-1500A. The average pore diameter of the micropores is about 0.5 μm, and the micropores having pore diameters larger than 0.55 μm take up 13.4% of the total micropores.

In addition, the blocking efficiency of the composite porous structure 1 is measured by the method as follows. (1) polystyrene (PS) standard particles (0.45 μm or 0.2 μm) were formulated into aqueous solutions of different concentrations, and the turbidity was measured by a turbidimeter to make a calibration curve that the concentration and turbidity have a linear relationship; (2) a solution of 100 nephelometric turbidity units (NTU) containing 0.45 μm polystyrene standard particles was prepared. The solution was filtered through the composite porous structure 1 before the polystyrene standard particles formed a filter cake on the coating surface 1012. The turbidity of the filtrate obtained after the filtration is 1 NTU, indicating that the composite porous structure 1 has a blocking efficiency of 99% for the 0.45 μm polystyrene standard particles Example 2

Figure 3:
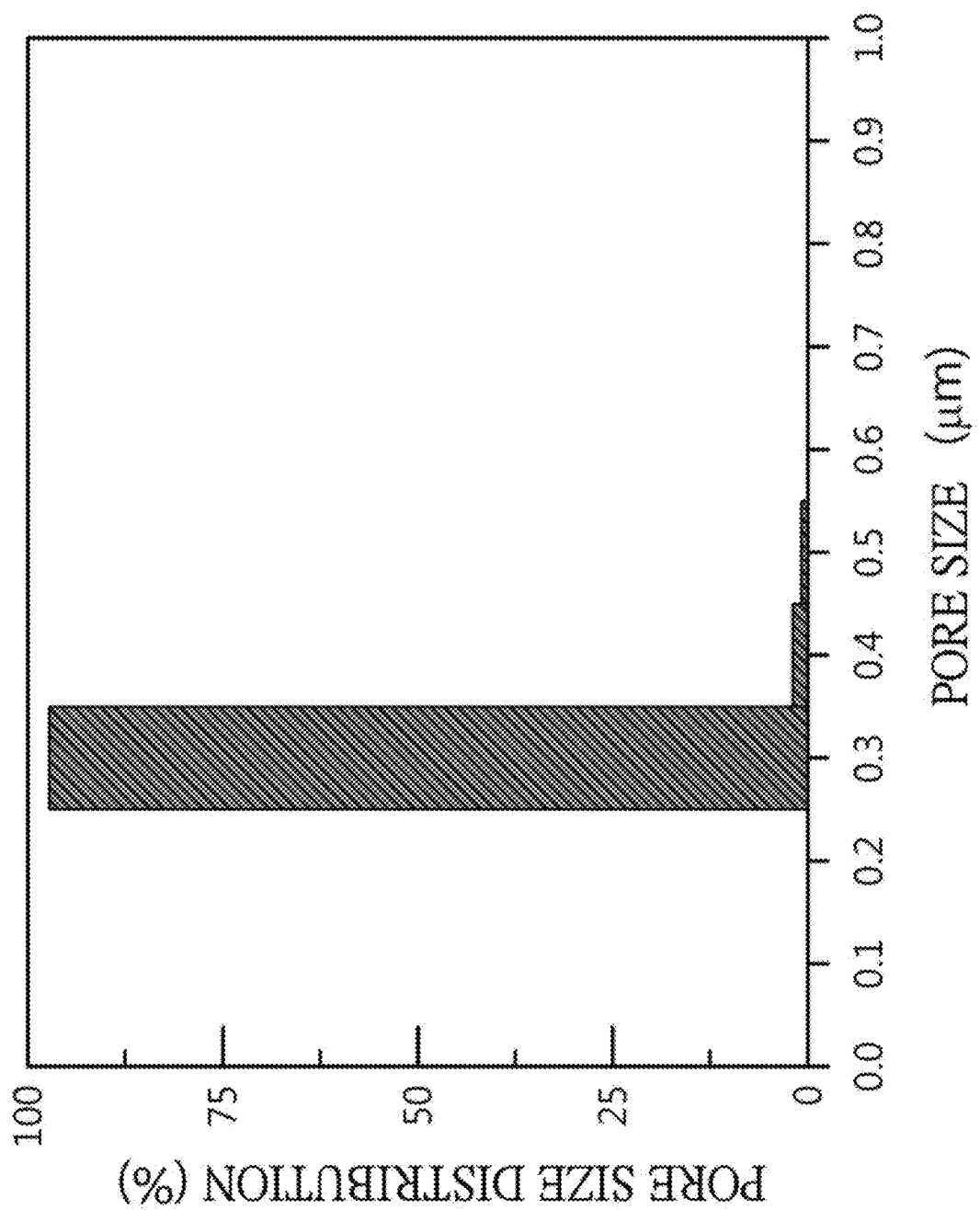
FIG. 3 is a pore size distribution diagram of micropores in the coating layer of the composite porous structure of Example 2.

The preparation method of Example 2 is similar to the preparation method of Example 1, the difference lies in that Example 2 repeats step (b) 5 times. The composite porous structure prepared in accordance with the preparation method of Example 2 comprises a porous substrate and a coating layer having multiple micropores formed on the second surface of the porous substrate. The average thickness of the coating layer is 48 μm and the average pore diameter of the micropores in the coating layer is about 0.32 μm. The pore size distribution thereof is shown in FIG. 3, wherein the micropores having pore diameters larger than 0.35 μm take up only 2.7% of the total micropores. In addition, the composite porous structure in accordance with the example has a blocking efficiency of 99% for the 0.2 μm polystyrene standard particles.

Comparative Example 1

Figure 4:
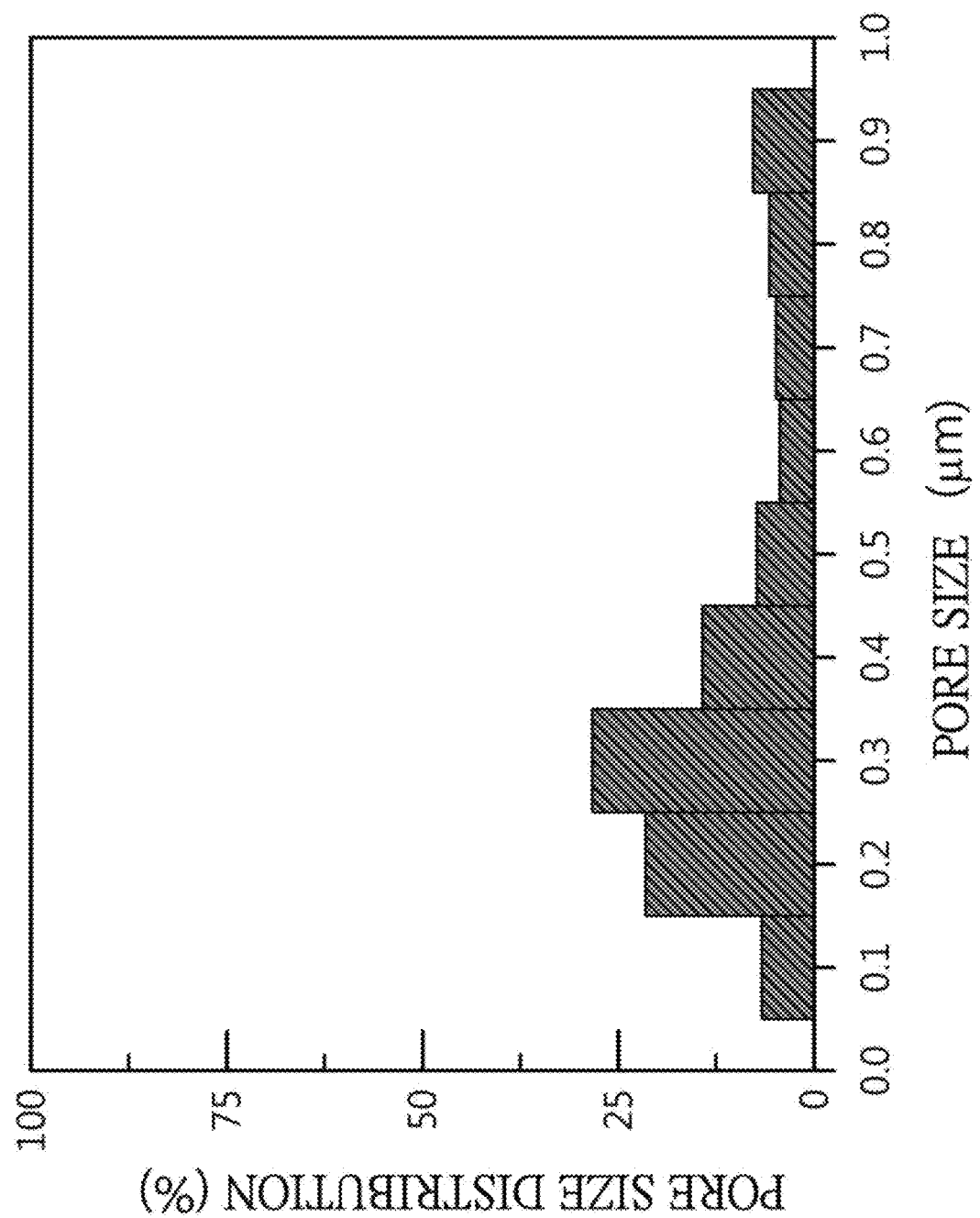
FIG. 4 is a pore size distribution diagram of micropores in the coating layer of the composite porous structure of a comparative example.
Figure 5:
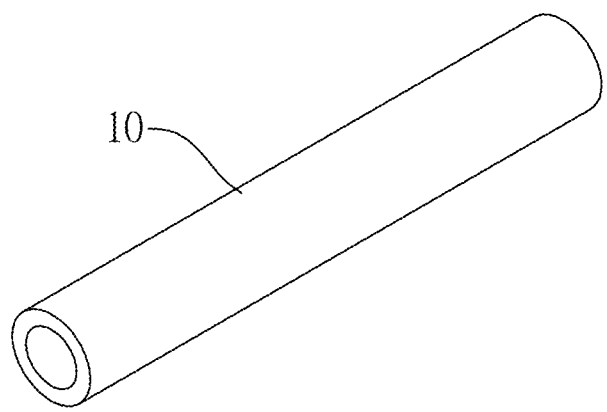
FIG. 5 to FIG. 7 are schematic perspective views of the porous substrate of the composite porous structure in accordance with the present invention.
Figure 6:
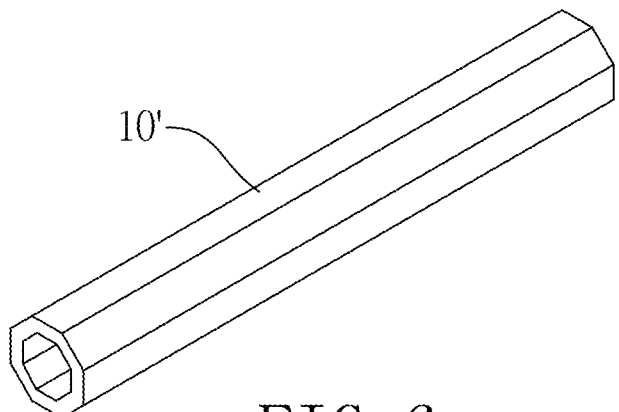
Figure 7:
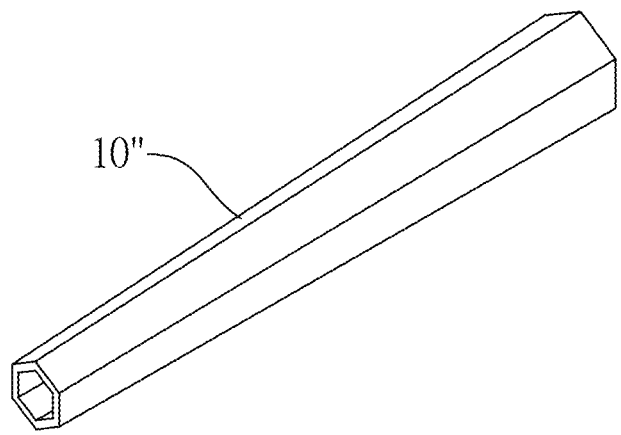

The preparation method of Comparative Example 1 is similar to the preparation method of Example 1, the difference lies in that, when the molten particles are sprayed onto the second surface of the porous substrate, no cooling fluid containing deionized water is continuously fed to contact the first surface of the porous substrate at the same time. In fact, the first surface of the porous substrate just statically contacts deionized water. The composite porous structure prepared in accordance with the preparation method of Comparative Example 1 contains a porous substrate and a coating layer having multiple micropores formed on the second surface of the porous substrate, wherein the average thickness of the coating layer is 25 μm and the average pore diameter of the micropores in the coating layer is about 0.33 μm. The pore sizes of these micropores in the composite porous structure are different. The pore size distribution is shown in FIG. 4, wherein the micropores having pore diameters larger than 0.35 μm take up 43.6% of the total micropores, and the micropores having pore diameters larger than 0.55 μm even take up 23% of the total micropores. Therefore, the composite porous structure in accordance with the comparative example has a blocking efficiency of only 83% for the 0.45 μm polystyrene standard particles. Referring to FIG. 5 to FIG. 7, the composite porous structure 1 of Example 1 can use the hollow tube 10 shown in FIG. 5 as the porous substrate 10. In addition, depending on the needs of different applications, the hollow column 10' shown in FIG. 6 or the hollow column 10" shown in FIG. 7 can be used as, but not limited to, a porous substrate without affecting the composite porous structure of the present invention.

In conclusion, the method for preparing the composite porous structure has a simple process, a short preparation time and a lower cost. Further, the method can adopt more various materials in combination to increase the application potential, and use no toxic organic reagents to meet the requirements of protecting environment. Besides, the composite porous structure obtained by the method of the present invention has a high uniformity of pore size and therefore has a good blocking efficiency.

Although the aforementioned description has described the numerous features, advantages, compositions and feature details of the present invention, it is just an exemplary description. The details of changes made in accordance with the invention in the range of the general meaning of the patent scope, especially the changes in shape, size, and arrangement, are still within the scope of the invention.

What is claimed is:

1. A preparation method for a composite porous structure, comprising the following steps:

step (a): preparing a porous substrate having multiple pores, a first surface and a second surface opposite to the first surface; and step (b): continuously feeding a cooling fluid to contact the first surface and to flow continuously to the second surface through the pores of the porous substrate, and heating a coating material to multiple molten particles by a heat source and spraying the molten particles onto the second surface of the porous substrate, so as to form a coating layer having multiple micropores on the second surface of the porous substrate and obtain the composite porous structure;

wherein a flow rate of the cooling fluid is between 0.1 L/min and 10 L/min, and a ratio of inflow volume to outflow volume of the cooling fluid is between 1:0.9 and 1:1;

wherein the coating material is an organic polymer coating material or an inorganic coating material; the coating layer having multiple micropores has an average thickness of 5 μm to 500 μm; and an average pore size of the micropores is between 0.01 μm and 5 μm.

2. The preparation method as claimed in claim 1, wherein the temperature of the molten particles is higher than the temperature of the cooling fluid.

3. The preparation method as claimed in claim 2, wherein the heat source temperature of step (b) is between 100° C. and 10000° C.

4. The preparation method as claimed in claim 2, wherein the cooling fluid temperature of step (b) is between 5° C. and 60° C.

5. The preparation method as claimed in claim 1, wherein the step (a) comprises the following steps:
step (a1): preparing the porous substrate; and
step (a2): filling a liquid into the pores of the porous substrate.

6. The preparation method as claimed in claim 5, wherein the liquid is water, alcohols, ketones, or combinations thereof.

7. The preparation method as claimed in claim 1, wherein the material of the porous substrate is an organic polymer material, a ceramic material, or a metal material.

8. The preparation method as claimed in claim 7, wherein when the material of the porous substrate is the organic polymer material, the organic polymer material includes polyethylene, polypropylene or polytetrafluoroethylene.

9. The preparation method as claimed in claim 1, wherein an average pore diameter of the multiple pores in the porous substrate is between 0.1 μm and 50 μm.

10. The preparation method as claimed in claim 1, wherein when the coating material is the inorganic coating material, the inorganic coating material is at least one selected from the group consisting of alkali metals, alkaline earth metals, silicates, aluminates, borates, titanates, phosphates, oxides, nitrides, oxynitrides, carbides, oxycarbides and halogen compounds; or when the coating material is the organic polymer coating material, the organic polymer coating material includes polyethylene, polypropylene or polytetrafluoroethylene.

11. A composite porous structure, which is prepared by the preparation method as claimed in claim 1, the composite porous structure comprising a porous substrate containing multiple pores and a coating layer having multiple micropores, the porous substrate having a first surface and a second surface opposite to the first surface, the coating layer disposed on the second surface of the porous substrate, and the coating layer containing an organic polymer coating material or an inorganic coating material, wherein the coating layer having multiple micropores has an average thickness of 5 μm to 500 μm; and an average pore size of the micropores is between 0.01 μm and 5 μm;

wherein the composite porous structure has a blocking efficiency more than 99%; wherein the blocking efficiency of the composite porous structure is defined as a percentage change of turbidity between an aqueous solution of 100 nephelometric turbidity units containing polystyrene standard particles and said aqueous solution after filtered through the composite porous structure.

12. The composite porous structure as claimed in claim 11, wherein the material of the porous substrate is an organic polymer material, a ceramic material, or a metal material.

13. The composite porous structure as claimed in claim 12, wherein when the material of the porous substrate is the organic polymer material, the organic polymer material includes polyethylene, polypropylene or polytetrafluoroethylene.

14. The composite porous structure as claimed in claim 11, wherein when the coating material is the inorganic coating material, the inorganic coating material is at least one selected from the group consisting of alkali metals, alkaline earth metals, silicates, aluminates, borates, titanates, phosphates, oxides, nitrides, oxynitrides, carbides, oxycarbides and halogen compounds; or when the coating material is the organic polymer coating material, the organic polymer coating material includes polyethylene, polypropylene or polytetrafluoroethylene.

* * * * *